(12) United States Patent
Paavilainen et al.

(10) Patent No.: US 10,360,320 B2
(45) Date of Patent: Jul. 23, 2019

(54) COMPUTER-AIDED MODELING OF A BENT SHEET OBJECT

(71) Applicant: Tekla Corporation, Espoo (FI)

(72) Inventors: Tuomo Paavilainen, Espoo (FI); Marko Aho, Espoo (FI)

(73) Assignee: Tekla Corporation, Espoo (FI)

( * ) Notice: Subject to any disclaimer, the term of this patent is extended or adjusted under 35 U.S.C. 154(b) by 429 days.

(21) Appl. No.: 14/942,561

(22) Filed: Nov. 16, 2015

(65) Prior Publication Data
US 2016/0140256 A1 May 19, 2016

(30) Foreign Application Priority Data
Nov. 18, 2014 (FI) .................................. 20140310

(51) Int. Cl.
*G06F 17/50* (2006.01)

(52) U.S. Cl.
CPC ...... *G06F 17/5009* (2013.01); *G06F 2217/42* (2013.01)

(58) Field of Classification Search
CPC .................... G06F 17/5009; G06F 2217/42
See application file for complete search history.

(56) References Cited

U.S. PATENT DOCUMENTS

| | | | |
|---|---|---|---|
| 6,525,745 B1 * | 2/2003 | Phelan | G06T 17/10 345/676 |
| 6,542,937 B1 * | 4/2003 | Kask | G05B 19/4097 700/182 |
| 8,718,811 B2 * | 5/2014 | Hindman | G06F 17/50 345/419 |
| 9,619,587 B2 * | 4/2017 | Griffith | G06F 17/50 |
| 2005/0071030 A1 | 3/2005 | Itoh | |
| 2010/0106463 A1 | 4/2010 | Hindman et al. | |
| 2013/0297263 A1 | 11/2013 | Chen et al. | |

FOREIGN PATENT DOCUMENTS

JP 2007172058 A * 7/2007

OTHER PUBLICATIONS

Finnish Search Report for Finnish Patent Application No. 20140310, dated Jul. 10, 2015, 2 pages.

* cited by examiner

*Primary Examiner* — Aniss Chad
(74) *Attorney, Agent, or Firm* — Kilpatrick Townsend and Stockton (57) ABSTRACT

A modeling application is provided with functionality that adds a bend between two flat sheets.

19 Claims, 4 Drawing Sheets

COMPUTER-AIDED MODELING OF A BENT SHEET OBJECT

RELATED APPLICATIONS

This application claims priority to Finnish Patent Application No. 20140310, filed on Nov. 18, 2014, the contents of which is hereby incorporated herein by reference in its entirety.

FIELD

The invention relates to computer-aided modeling.

BACKGROUND

Modeling means that a model is created from an article/structure under design for describing the article/structure to be constructed, the model containing at least information needed to illustrate the article/structure. The development of data processing systems and computers has transformed modeling into a computerized process, where a product model is created from the article/structure. A wide variety of software applications, including computer-aided design applications and three-dimensional modeling applications, are currently available to end-users to prepare or edit a model, and/or to obtain necessary information from the model.

SUMMARY

The invention relates to methods, a program product, an apparatus and a system which are characterized by what is stated in the independent claims. The preferred embodiments are disclosed in the dependent claims.

A general aspect provides an automated bend generation tool that generates a bent joint between two flat sheets that have been modeled into their intended location and position in a model.

BRIEF DESCRIPTION OF THE DRAWINGS

In the following different embodiments of the invention will be described in greater detail with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s)/example(s), or that the feature only applies to a single embodiment/example. Single features of different embodiments/examples may also be combined to provide other embodiments.

The present invention is applicable to any computer-aided modeling system, and corresponding modeling applications (i.e. modeling programs). Various programming techniques, storage of data in memory and manners of modeling real world articles and implementing databases develop constantly. This may require extra changes in the invention. Consequently, all terms and expressions should be interpreted broadly, and they are intended to describe, not to restrict, the invention.

FIGS. 1A, 1B, 1C and 1D illustrate basic concepts used herein when creating a 3D model of a bent sheet structure is described. A bent sheet structure is a structure or assembly fabricated or manufactured from ductile material that can be bent/folded over a straight line. Examples of such ductile material include metal, plastic, paper, etc. For example, a bent sheet structure made of metal may be called a sheet metal structure or a sheet metal piece. Depending on a thickness of a sheet piece, it may be called a foil or leaf or plate.

A 3D model of a bent sheet structure is an object, called herein a bent sheet object that represents/models a structure that can be manufactured (fabricated) by bending a flat sheet possibly several times. In other words, the bent sheet structure is modelled to form a single sheet object so that the 3D bent sheet object modeled/created in a folded state can be unfolded to 2D (unfolded) object. The simplest case is a bent sheet structure with one zero-radius bend between two flat areas, but the bent sheet structure may have several bends between unbent sheet portions. A bend may be a conical bend or a cylindrical bend. A bent sheet structure may have zero or more conical bends and zero or more cylindrical bends.

An object may also be called an entity, a product model, a product model of a structure, a model of a structure, a representation of a structure and a digital structure. Further, instead of term structure, corresponding terms of real world structures, like article, element, piece and part may be used as well.

Figure 1A:
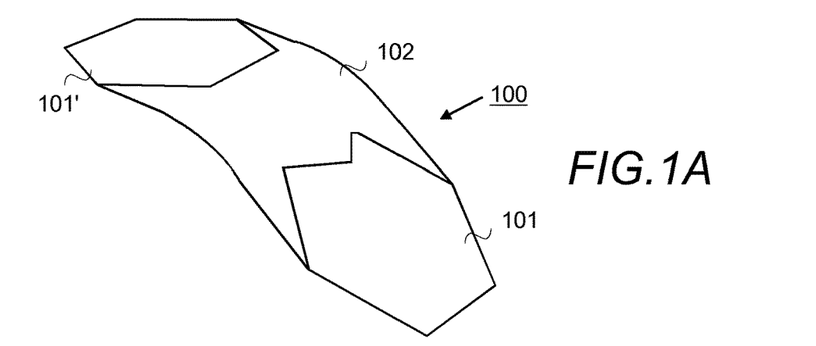
FIGS. 1A, 1B, 1C and 1D illustrate bent sheet structures and basic concepts.

Referring to FIG. 1A, the bent sheet object 100 comprises at least two flat sheet objects 101, 101' and a bend object 102 connecting the at least two flat sheet objects 101, 101'.

A flat sheet object 101, 101' is a sub-object of the bent sheet object 100. The flat sheet object 101, 101' may be modelled as a conventional object, by a user or automatically by a modeling program, by defining geometry of the flat sheet object 101, 101' and its intended final location in the model. The only restriction relating to the geometry is that the flat sheet object, as a separate object and not as a part of a bent sheet object, has to be flat at least on the edges which are to be combined, but otherwise it may be any arbitrary shaped object. The intended final location means a location where the unbent sheet portion (flat part) of the bent sheet objects is modeled/planned to be in the modeled construction or assembly. Naturally, modification of a model may change the intended final location.

The bend object 102 is another type of a sub-object of the bent sheet object 100. The purpose of the bend object 102 is to connect two flat sheets objects 101, 101'. Although it is possible for a user to model the bend object 102, a tool for modeling the bend object 102 automatically is provided herein, and the tool will be described in more detail below. Therefore, herein bend object means an automatically created sub-object.

Figure 1B:
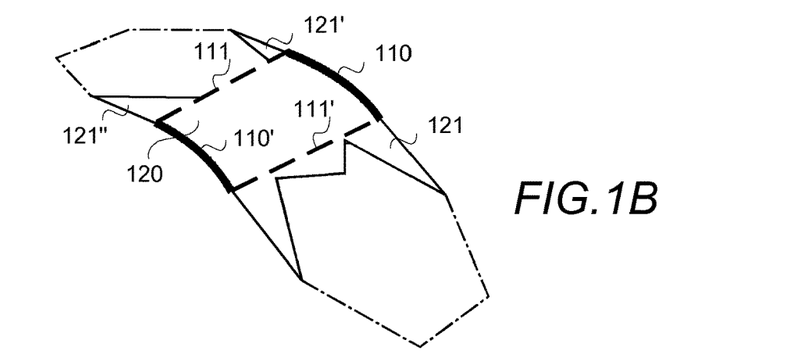
Figure 1C:
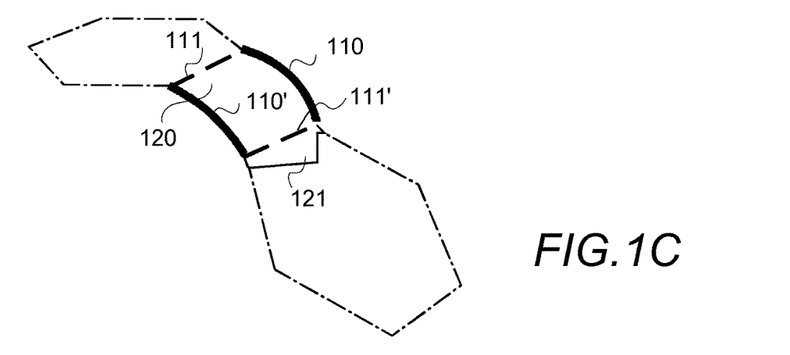

Referring to FIGS. 1B and 1C, the flat sheet objects are illustrated with a dash-dot line to more clearly illustrate the bend object. The bend object comprises a curved section 120, and it may comprise zero, one or more sheet extension sections 121, 121', 121". The curved section has lateral boundaries 110, 110', depicted by weighted lines in FIGS. 1B and 1C, and discontinuity boundaries 111, 111' depicted by dashed lines in FIGS. 1B and 1C. The lateral boundaries 110, 110' may have any shape, and lateral boundaries of a curved section may have different shapes. The shape of a lateral boundary may be based on a default shape, or the modeling program may be configured to select the shape, or a user may be prompted to define the shape. For example, a lateral boundary may go along geodesic and hence be a straight line when the bent sheet object is unfolded, or a lateral boundary may follow the directrix curve of a bent object's surface. A discontinuity boundary 111, 111' is a boundary between the curved section and a flat sheet object, or if there is a sheet extension section between the curved section and the flat sheet object, the discontinuity boundary is between the sheet extension section and the curved section. If the curved section 120 has a cylindrical geometry, the discontinuity boundaries 111, 111' are parallel to each other. If the curved section 120 has a conical geometry, the discontinuity boundaries 111, 111' intersect on an intersection line of flat sheet object planes between which the curved section 120 will be created. Since the tool for modeling the bend object 102 utilizes multi-objective optimization, as will be described in more detail below, it depends on a variable determining tradeoff between the objectives in the multi-objective optimization, flat sheet object geometries, and/or user input, whether the automatically generated bend object 102 is the one illustrated in FIG. 1B or the one illustrated in FIG. 1C, or something else. Nevertheless the user will be able to modify the bend object 102 afterwards.

Figure 1D:
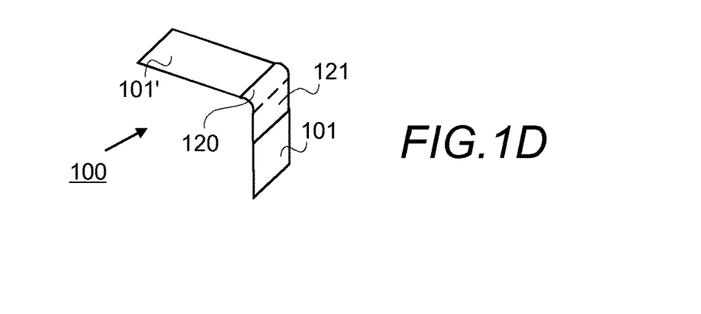

FIG. 1D illustrates a bent sheet object 100 that comprises two flat sheet objects 101, 101' connected by a bend object comprising a curved section 120 and a sheet extension section 121, the boundary, i.e. one of the discontinuity boundaries, between the sheet extension section 121 and the curved section 120 being illustrated by a dashed line. As can be seen from FIG. 1D, thanks to the sheet extension section 121, the curved section may be made to be sharply curving even when a flat sheet object is modelled with a little bit too short dimension. In other words, the sheet extension section facilitates modelling even when no complex geometries are involved.

Although in the examples illustrated in FIGS. 1A, 1B, 1C and 1D two flat sheet objects are joined by a bend object, it should be appreciated that in real life a bent sheet object may comprise three or more flat sheet objects joined by two or more bend objects; two flat sheet objects with one bend object. In such a case the bend objects may have different geometry.

Figure 2:
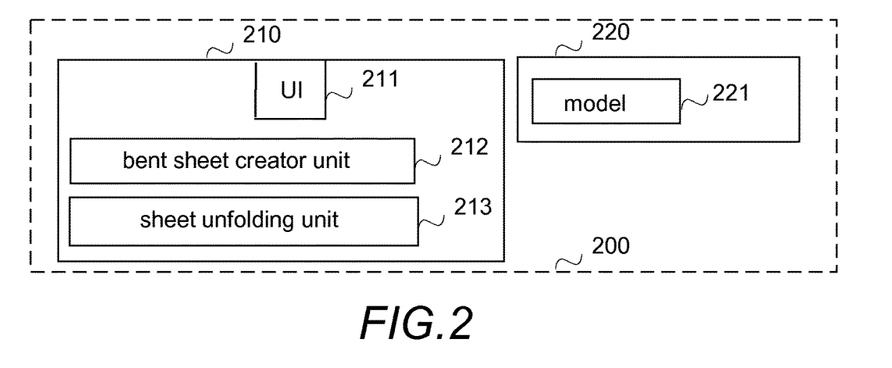
FIG. 2 shows a simplified architecture of an exemplary system and a schematic block diagram of an exemplary apparatus.

FIG. 2 illustrates a simplified modeling system describing only some logical units with their operative connections, the implementation of which may deviate from what is presented. It is obvious to a person skilled in the art that the system may also comprise other functions and structures that need not be described in greater detail here. The more detailed structure of the system is irrelevant to the actual invention.

The modeling system 200 illustrated in FIG. 2 is a simplified modeling system that comprises one or more apparatuses 210 (only one shown in FIG. 2) and a modeling environment with one or more data storages 220 (only one shown in FIG. 2) or memories that may be an external data storage to an apparatus or an internal data storage or partly external and partly internal.

The apparatus 210 may be any computing apparatus that can be configured to model ductile material sheet bends. For that purpose the apparatus 210 comprises one or more user interfaces 211, a bent sheet creator unit 212 and a sheet unfolding unit 213. The apparatus can be further configured to create and/or modify and/or edit and/or change and/or view and/or output other information from a model. Examples of such apparatuses include a user terminal or a work station, such as a laptop, a smartphone, a personal computer, a tablet computer, a field device, an e-reading device, or a personal digital assistant (PDA), or a server, like a cloud server or a grid server.

A user interface 211 is the interface of the user, i.e. the person processing the model, to the modeling system. The user can create a model, modify a model, study it, output desired drawings and/or reports of the model, view the model, input information to the model, etc. by using the one or more user interfaces 211.

The bent sheet creator unit 212 is the tool for creating a bent sheet object. Further, in the illustrated example the bent sheet creator unit 212 is a tool for checking that during editing/modifying a bent sheet object it remains unfoldable. The sheet unfolding unit 213 is for unfolding the bent sheet object to a plain sheet object. As is known by one skilled in the art, there are several ways and algorithms to unfold a folded object and any of them can be used herein. Therefore there is no need to describe the functionality in more detail herein. It should be appreciated that the bent sheet creator unit 212 and the sheet unfolding unit 213 may be integrated into one unit, and/or they or one of them may be divided into sub-units. Exemplary functionalities of the bent sheet creator unit will be described in more detail below.

In the illustrated example, the data storage 220 in the modeling environment comprises one or more models 221.

The modeling system 200 illustrated in FIG. 2 represents the simplest modeling system. In larger modeling systems, the apparatus may be a terminal and the data storage a database with which the terminal communicates via a server. In such a system, the server may be configured to perform one or more of the bent sheet creator unit functionalities and/or sheet unfolding unit functionalities. The data storage may be any kind of conventional or future data repository, including distributed and centralized storing of data, managed by any suitable management system forming part of the modeling environment. An example of distributed storing includes a cloud-based storage in a cloud environment (which may be a public cloud, a community cloud, a private cloud, or a hybrid cloud, for example). The implementation of the data storage, the manner how data is stored, retrieved and updated, and the location where the bent sheet creation and/or unfolding are performed are irrelevant to the invention. Further, the modeling system may comprise several terminals and servers with databases, which are preferably integrated to be visible to the user as one database and one database server.

In the following, the invention will be described by using an exemplary evolved system that utilizes a run-time database comprising information to be stored and already stored in a disc memory of an apparatus, without restricting the invention thereto. In another embodiment of the invention, an object-oriented database or a relation database, for example, can be utilized and used over a network, for instance.

In the following examples it is assumed that flat sheet objects that are to be connected/joint by a bend object have the same thickness. However, it should be appreciated that the same thickness restriction applies only to edges that are to be connected/joint, and that the same thickness does not mean exactly the same thickness but the same thickness within a tolerance. Further, in the calculations and determinations a zero thickness is assumed, and that a flat sheet object comprises outer borders as edges, and if there is a hole in the flat sheet object, the flat sheet object comprises borders of the hole. Thanks to the zero thickness, a flat sheet object can be treated as a polygon. It should be appreciated that the boundary representation, often abbreviated as B-rep or BREP, may be used as well with the restriction that thickness has to be more than zero.

Figure 3:
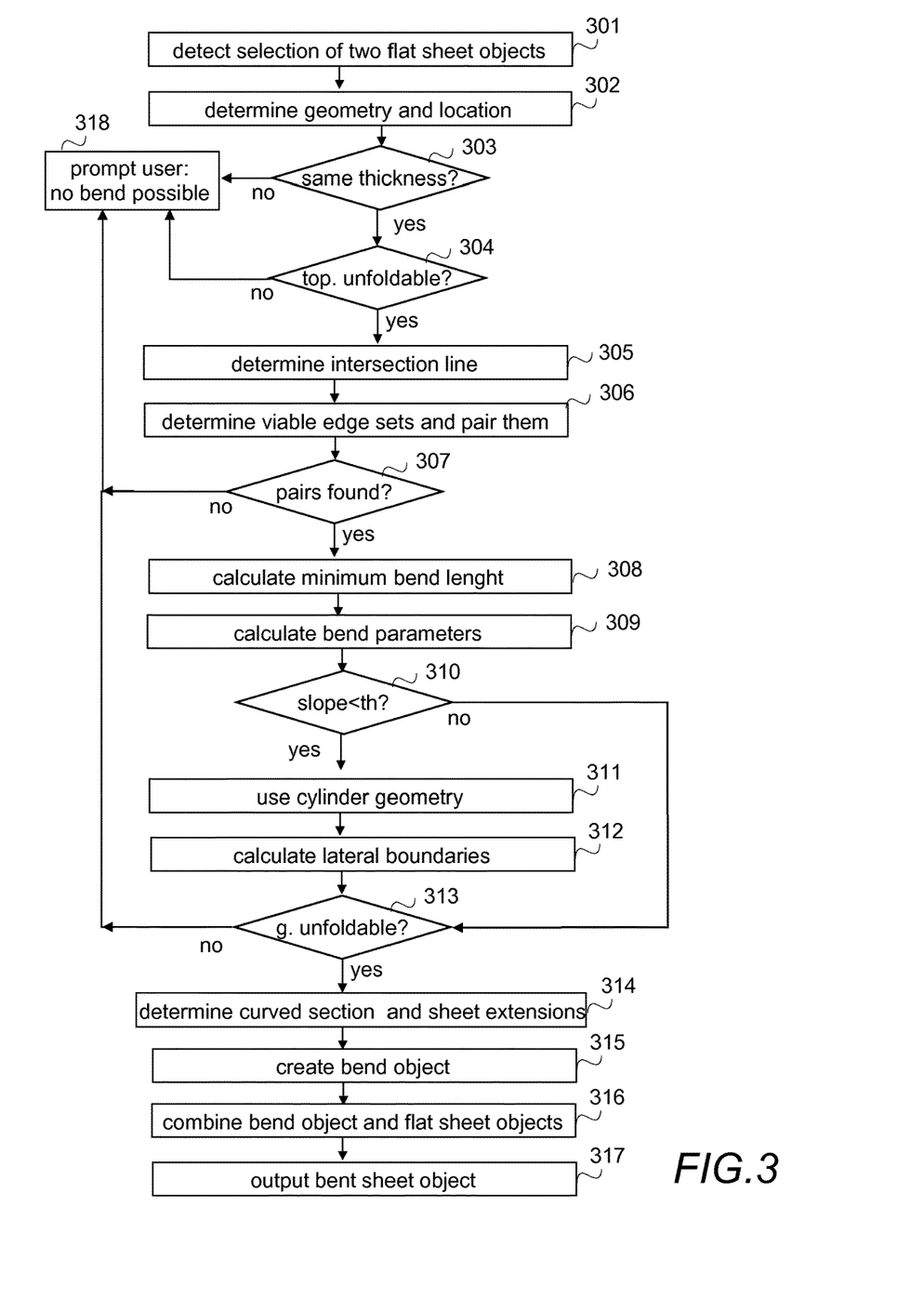
FIGS. 3 to 6 illustrate different exemplary functionalities.
Figure 4:
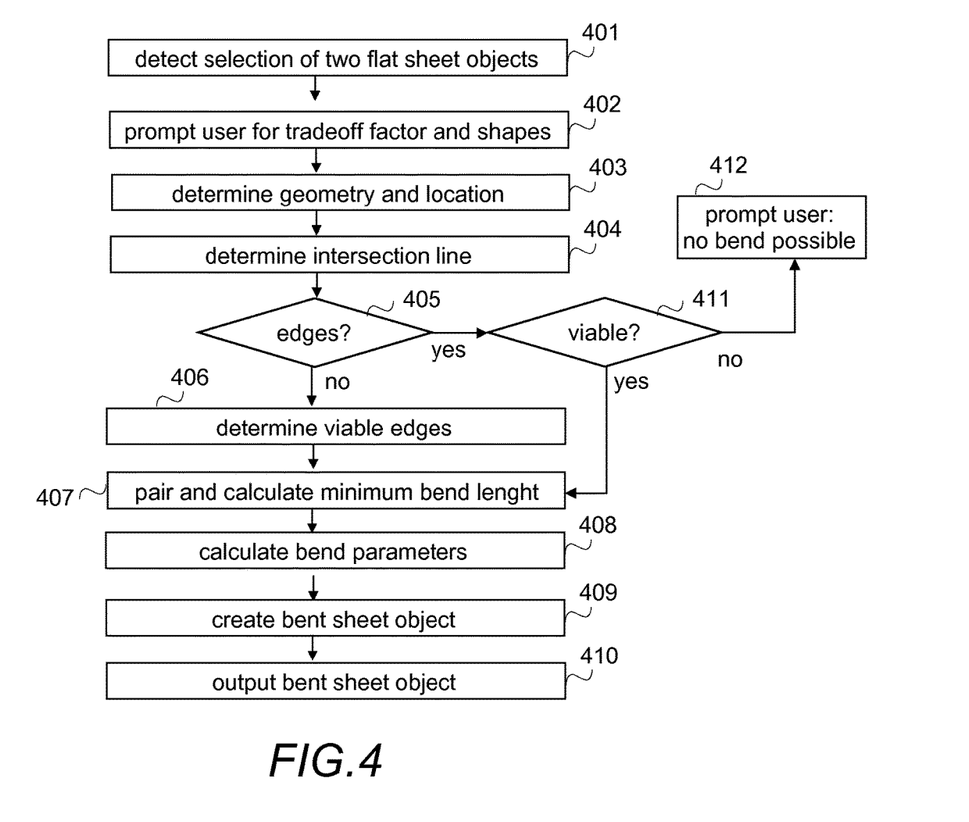
Figure 5:
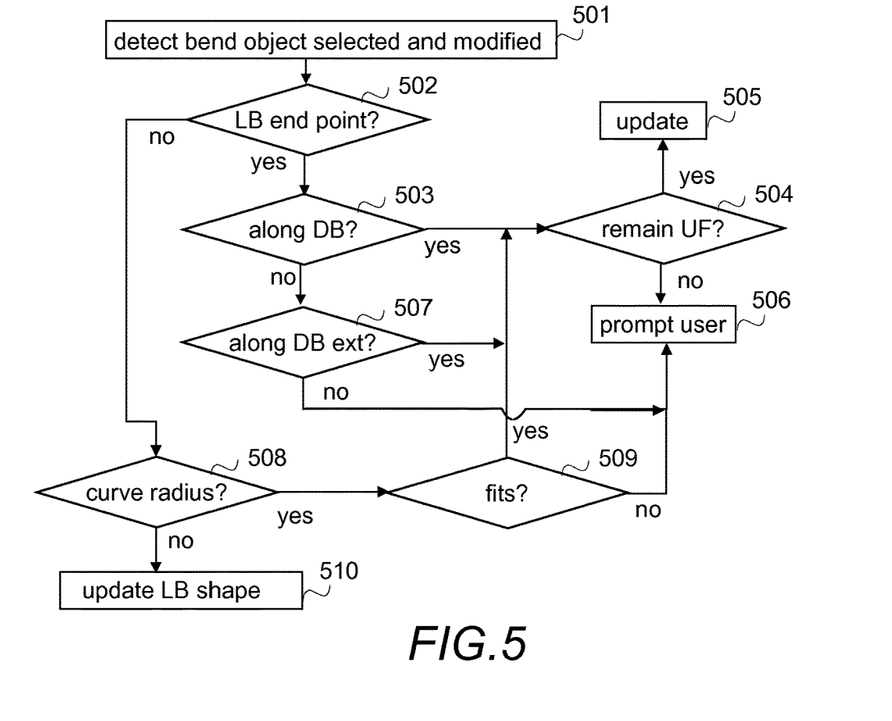
Figure 6:
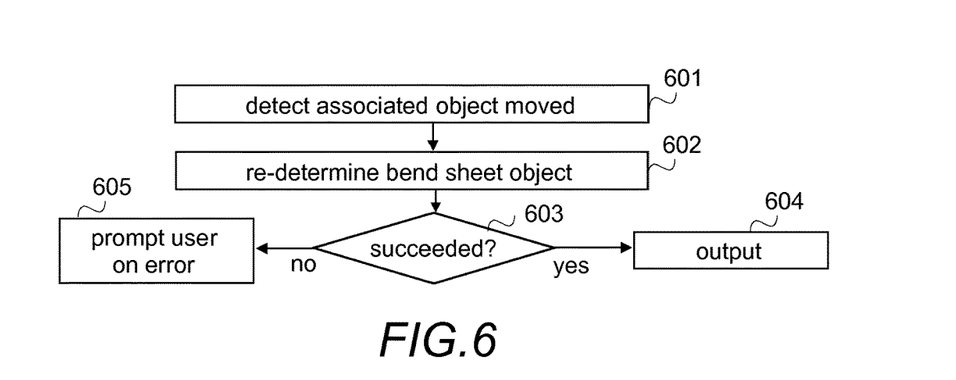

FIGS. 3, 4, 5 and 6 illustrate an exemplary functionality of the bent sheet creator unit, FIGS. 3 and 4 illustrating the creation of the bent object and FIGS. 5 and 6 editing of an earlier created bent object.

In the example illustrated in FIG. 3 it is assumed that the bend creation is started with assuming a conical bend, i.e. the conical bend is a default value.

FIG. 3 is a flow chart illustrating one example of creation of a bend. More precisely, it illustrates an exemplary functionality of the bent sheet creator unit. In the example it is assumed, for the sake of clarity, that only one bend is created. However, the process may be repeated for each selected flat sheet object pairs, even though one or both of them would already belong to at least one bent sheet object, which are sub-objects of a bent sheet object comprising two or more bends.

Referring to FIG. 3, it is assumed that the user has modeled flat sheet objects, or retrieved a model comprising flat sheet objects, and that the user has selected "create bends", or "connect" functionality, for example. Then a user input selecting two flat sheet objects is detected in step 301, and the geometry and location of the selected flat sheet objects are determined in step 302. Once the geometry is known, it is checked in step 303, whether or not the thicknesses of the selected flat sheet objects are the same. If both flat sheet objects have the same thickness, it is checked in step 304 whether or not the bent sheet object to be created is topologically unfoldable. Typically, when the first bent is to be created, the flat sheet objects are modeled in such a way that they can easily be combined to a topologically unfoldable bent sheet object. However, for a second bent, or a third bent, etc. the situation may be different, and therefore it is advisable to perform the checking in order to avoid unnecessary processing and calculation resources misuse. An article is topologically unfoldable when all the connections of the article remain connected when unfolding occurs. Intuitively it means that the article should be such that it can be unfolded without cutting. There exists several known methods for checking the topological unfoldability, and any of them may be used. Since the methods are well known there is no need to describe them in detail herein.

If the bent sheet object to be created is topologically unfoldable (step 304), an intersection line of planes on which the selected flat sheet objects locate is determined in step 305. Then viable edge sets of the selected flat sheet objects are determined in step 306 and paired to each other. A viable edge is an edge that does not intersect with the intersection line determined in step 305. This means that on both sides of the edge the normal point either towards or away from the intersection line. Pairing means that for an edge in one of the flat sheet objects an edge in the other one of the flat sheet objects and having normal pointing to the same direction is search for, and if found, the edges are paired. For a polygon, the pairing may be performed to a group of consecutive edges, when an edge is interpreted to be between two consecutive points defining the border geometry of the polygon. However, for the sake of clarity, herein the term "edge set" is used, in addition to such groups of edges, for one edge. Other criteria for pairing may be used as well. For example, edges closest to each other may be selected and paired, edges facing each other with a very small angle may not be selected and paired. However, the purpose of this step of selecting and pairing edges is to find all edge set pairs that could be combinable. The edges that will be combined may be a subset of the edge set pairs found in this step.

If at least one edge set pair is found (step 307), a minimum bend length is calculated in step 308. The minimum bend length is a kind of an estimation of a shortest possible curved section. The minimum bend length is calculated in order to take into account the distance between the flat sheet objects to be combined when selecting the final bend object geometry parameters and topology. The idea behind calculating the minimum bend length is that it enables to take into account the distance between the two flat sheet objects so that the effect of selected edges to the width of the curved section can be taken into account when the final geometry and topological parameters for the bend object are determined, even when the flat sheet objects are far from each other. One way to calculate is go through of all $n_1 n_2$ possible combinations of edges in the selected and paired edge sets), $n_1$ being the number of edges in the selected edge set on the first flat steel object and $n_2$ being the number of edges in the selected edge set on the second flat steel object. Another way is to calculate arithmetic distance between the points on the selected edges, and then utilize the fact that the bend length is always equal to or greater than the arithmetic distance. A third way to calculate the minimum bend length is to formulate a nonlinear multivariate optimization problem with the average length represented either as the quotient of the curved section and its width, or as the arithmetic mean of the length of the lateral boundaries. A fourth way is to simplify the problem so that it can be formulated as a mixed integer linear programming problem. For example, following assumptions may be made:

1. The lateral boundary follows a directrix curve.
2. The end points of the lateral boundary are projected to the same point on the intersection line between the flat sheet objects from the corresponding polygon vertices on both sides of the bend.
3. The sheet extension section's lateral edge is assumed to be perpendicular to the intersection line.
4. The lateral boundary is not assumed to be continuous or differentiable.

The assumptions 1 and 2 enable that an average length of the curved section may be calculated as a linear function of decision parameters. Thanks to the assumption 3, the sheet extension section's length function is linear.

Following system of equations (1), i.e. a first formula set, represents one simplification of the optimization problem for calculating an estimation of the minimum bend length with the following assumptions:

1. The lateral boundary of the curved section follows a directrix curve whose all points are projected to the same point on the intersection line of the planes defined by the flat sheet objects,
2. The sheet extension section's lateral edge is perpendicular to the intersection line.

$$\min_{\epsilon_1,\epsilon_2} \overline{L}_{curve}(\epsilon_1,\epsilon_2,p) + \overline{L}_1(\epsilon_1,\epsilon_2,p) + \overline{L}_2(\epsilon_1,\epsilon_2,p) + \overline{L}_{shift}(\epsilon_1,\epsilon_2,p) \quad (1)$$

s.t. $E_1 \epsilon_1 = 1$
$E_2 \epsilon_2 = 1$
$\Sigma \epsilon_1 = 1$
$\Sigma \epsilon_2 = 1$ wherein $L_{curve}$ is the average length of the curved section, $L_1$ is the average length of the sheet extension section on the side of the polygon 1, $L_2$ is the average length of the sheet extension section on the side of the polygon 2, $L_{shift}$ is a measurement of distance between the lateral edge of the curved section and the lateral edge of the sheet extension section on the discontinuity boundary, $\epsilon_1$ is a binary vector determining the selected edge on the side of the flat sheet object 1, $\epsilon_2$ is a binary vector determining the selected edge on the side of the flat sheet object 2, p is a vector of the bend parameters $E_1$ is a binary vector determining the possible edge on the side of the flat sheet object 1, $E_2$ is a binary vector determining the possible edge on the side of the flat sheet object 2.

As can be seen from formula set (1), the decision variables are $\epsilon_1 \epsilon_2$ and p, and functions $L_{curve}$, $L_1$ and $L_2$ are to be formulated as linear functions of the variables. For a conical bend, the bend parameters are the location of the cone apex and a parameter defining a steepness of the cone.

Since the components $L_{curve}$, $L_1$ and $L_2$ are all measurements of distance perpendicular to the intersection line, $L_{shift}$ is added there to add a component measuring the distance parallel to the intersection line as well.

Note: Because of the assumptions given above the lateral boundary is not continuous on the point where it crosses the discontinuity boundary.

Following system of equations (2), i.e. a second formula set, represents another simplification of the optimization problem for calculating an estimation of the minimum bend length.

$$\min_{\epsilon_1,\epsilon_2} \frac{A(\epsilon_1, \epsilon_2)}{w(\epsilon_1, \epsilon_2)} \quad (2)$$

$$E_1 \epsilon_1 = 1$$

$$E_2 \epsilon_2 = 1$$

$$\sum \epsilon_1 = 1$$

$$\sum \epsilon_2 = 1,$$

wherein

A is a function of decision variables determining the area of the bend object, w is a function of the decision variables determining the width of the bend object, $\epsilon_1$ is a binary vector determining the selected edge on the side of the flat sheet object 1, $\epsilon_2$ is a binary vector determining the selected edge on the side of the flat sheet object 2, $E_1$ is a binary vector determining the possible edge on the side of the flat sheet object 1, $E_2$ is a binary vector determining the possible edge on the side of the flat sheet object 2.

As can be seen from formula set (2), the decision variables are $\epsilon_1$ and $\epsilon_2$.

Note: If the formula set (2) will be solved using mixed integer linear programming, A and w should be simplified in such a way, that A/w will be a linear approximation of its value, i.e., A and w should be substituted with such simplifications, that $A_1/w_1$ is a linear approximation of A/w, where A1 is the simplification of A and w1 the simplification of w.

As one skilled in the art of mixed integer linear programming knows, the above formulations, as simplifications, does not describe the full problem, but additional constraints defining the geometric restrictions of the problem and possibly other constraints and even variables may need to be taken into account and added to a formula or formulas, according to the chosen formulation approach. There are several different ways to formulate the optimization problem, and the exact formulation may be freely chosen by the person implementing the system.

After the minimum bend length is calculated, bend parameters are calculated in step 309 by using a multi-objective optimization, the bend parameters including edges (or portions of edges) that are connected with the bend object. The principles for the multi-objective optimization may be the following:

The edges selected as a result of running the multi-objective optimization model used are such that a conical or a cylindrical bend object can be added between the selected edges.

The curved section is as wide as possible as allowed by a used value of the tradeoff.

An estimated length of the curved section needs to be as small as possible.

The length of the sheet extension section(s) needs to be as small as possible.

Edges need to be selected in such a way that no holes appear in the curved section and edges on either side have to form one continuous string of edges, or an open polygon.

The multi-objective optimization for the bend object takes into account a tradeoff between a length and a width of a bend. A value used for the tradeoff, i.e. a tradeoff value, is preferably a constant value that may be a preset value stored to a memory, like it is assumed in the example, or the constant value may be received as a user input. The tradeoff value determines the relation of a net average length to a net width. The net average length is the difference between a bend length and the minimum bend length calculated in step 308. The net width is the difference between a bend width and the minimum bend width. The multi-objective optimization problem may be simplified to be a mixed integer linear programming (MILP) problem, expressed as the following formula set (3), for example:

$$\min -w(\epsilon_1,\epsilon_2,p)+\delta L(\epsilon_1,\epsilon_2,p)$$

$$s.t. \Delta L(\epsilon_1,\epsilon_2,p) \leq \xi \Delta w(\epsilon_1,\epsilon_2,p) \quad (3)$$

wherein $\Delta L$ is the net average length, $\xi$ is the value for the tradeoff, $\Delta w$ is the net width, w is the width, $\epsilon_1$ is a binary vector determining the selected edges on the side of the flat sheet object 1, $\epsilon_2$ is a binary vector determining the selected edges on the side of the flat sheet object 2, p is a vector of the bend parameters, $\delta$ is a small real valued constant.

As can be seen from formula set (3), the decision variables are $\epsilon_1$ and $\epsilon_2$.

The target is to maximize the width, and the length is controlled based on the tradeoff. $\delta$ is added to ensure that maximization of the width precedes minimization of the length, and that the tradeoff is controlled by the constraints with a constant $\xi$, not by weighting the objectives. However, in some other implementation $\delta L(\epsilon_1, \epsilon_2, p)$ may be left out from the formula set.

Below the concept used in the example and relating to linearization and length and width are described in more detail.

Net length ΔL is the difference between the bend length L and the minimum length $L_{min}$ (constant).

The bend length L needs to be a linear function of the decision variables. Therefore it is an approximation of the actual bend length in the same way as it is in the minimum length bend problem. There are many different approaches how to define the length when several edges are selected, and the selected formulation depends on a target (thing) to be minimized. A bend with several selected edges does not have an unambiguous length, but rather a length profile. It is possible to formulate the length measurement L so that it approximates the absolute length of the bend. It is also possible to formulate the length so that it approximates an average length of the bend. One way to linearly approximate the length of the bend with a cone surface and is to use formula 4:

$$L(\epsilon_1,\epsilon_2,p) = L^*_{curve}(\epsilon_1,\epsilon_2,p) + L^*_1(\epsilon_1,\epsilon_2,p) + L^*_2(\epsilon_1,\epsilon_2,p) + L_{shift}(\epsilon_1,\epsilon_2,p) \quad (4)$$

wherein $L^*_{curve}$ is the length of the longest directrix curve of the bend, $L^*_1$ is a maximum length of a line segment perpendicular to the intersection line, starting from a polygon point, ending to the discontinuity boundary, on the side of the flat sheet object 1, $L^*_2$ is the maximum length of a line segment perpendicular to the intersection line, starting from a polygon point, ending to the discontinuity boundary, on the side of the flat sheet object 2, $L_{shift}$ is a measurement of distance between the lateral edge of the curved section and the lateral edge of the sheet extension section on the discontinuity boundary.

Since the components $L^*_{curve}$, $L^*_1$ and $L^*_2$ are all measurements of distance perpendicular to the intersection line, $L_{shift}$ is added there to add a component measuring the distance parallel to the intersection line as well.

Note: because of the assumptions given above the lateral boundary is not continuous on the point where it crosses the discontinuity boundary.

As can be seen, the length L as defined above does not correspond to any actual trajectory on the bend surface, but is a rough measurement of the longitudinal extent of the bend. It is defined in such a way that one skilled in the art of mixed integer linear programming can formulate the length, using auxiliary variables, as a linear function of the decision variables.

It should be appreciated that instead of a conical geometry, a cylindrical geometry could be assumed. Further, simpler assumptions could be used as well.

As to net width, it is a difference between a bend width w and the width of the minimum length bend. The bend width may be calculated by first calculating a length of a line segment spanning between the projections of extreme points of the selected edges to the intersection line, on the polygons on both sides. (An extreme point is a point in a convex set which does not lie in any open line segment joining two points in the set.) Then the width can be calculated as the sum of an arithmatic average of these values. This approach gives a good estimate of the width of the bend, and with the use of auxiliary variables, one skilled in the art of mixed integer linear program design can formulate the bend width as a linear function of the decision variables.

The mixed integer programming problem described herein for finding the optimum bend topology and bend parameters assumes that the coordinates of the polygons defining the flat sheet objects are converted into a two dimensional coordinate system defined on both sides as follows:

The x-axis (of the 2-dimensional coordinate system) is aligned to be parallel to the intersection line between the planes of the polygons.

On the side of the flat sheet object 1, the y-axis is set on the same plane as the flat sheet object, pointing towards the polygon.

On the side of the flat sheet object 2, the y-axis is set similarly, i.e. on the same plane as the flat sheet object, pointing towards the polygon.

The origin on both sides is selected so that they coincide at a point on the intersection line.

The x-axis direction is selected so, that they point to the "same" direction on both of the coordinate systems.

The use of the above described coordinate systems makes it possible to refer to a point on the intersection line (such as the apex of the cone geometry) using a single explicit coordinate value.

It should be appreciated that the geometry of the bend used in the MILP-program formulation may be (and normally is) different from the geometry used in the final bend created, since the geometry of the bend is simplified to enable to calculate the optimal geometry using mixed integer linear programming.

Following assumptions to simplify the problem may be made:

Calculation of width is linearized by assuming that the lateral boundary endpoints are projected to the same point on the intersection line between the flat sheet objects.

One way to determine edges is to find a string of polygon points on either side, wherein binary vectors determining the selected corner points/edges ($\epsilon_1$, $\epsilon_2$ described above) are assumed to consist of a string of consecutive ones and the rest zeroes, or vice versa.

The length is defined as an absolute length that is a sum of a maximum length of the curved section circular directrix curve, a maximum distance of a polygon corner point from the discontinuity boundary, on a line perpendicular to the intersection line, over all selected points in polygon 1, a maximum distance of a polygon corner point from the discontinuity boundary, on a line perpendicular to the intersection line, over all selected points in polygon 2, and a shift along the intersection line. This is one way to determine a function determining the length of the bend to approximate the average length of the bend, the function being a linear function of decision variables.

When the shift along the intersection line is calculated as a sum of differences of extreme values of from side to side, the multi-objective optimization problem can be expressed as a following problem:

$$\min -\frac{x_i^1 \epsilon_{max}^1 - x_i^1 \epsilon_{min}^1}{2} - \frac{x_i^2 \epsilon_{max}^2 - x_i^2 \epsilon_{min}^2}{2} + \frac{1}{M}\left(\sum (\epsilon^1(k) y_k^1 - y_{\beta 1}(k)) + \sum (\epsilon^2(l) y_i^1 - y_{\beta 2}(l))\right)$$

s.t.

-continued $$\epsilon^i(k) - \epsilon^i_{max}(k) \geq 0, \epsilon^i(k) - \epsilon^i_{min}(k) \geq 0 \forall k \in n_i$$

$$1^T \epsilon^i_{max} = 1, 1^T \epsilon^i_{min} = 1$$

$$\Psi_\alpha(y_{\beta 1-max} + y_{\beta 2-max}) + L_{1,max} + L_{2,max} + x^{shift}_{max} + x^{shift}_{min} - L_{min} \leq$$

$$\xi \left( \frac{x^1_i \epsilon^1_{max} - x^1_i \epsilon^1_{min}}{2} + \frac{x^2_i \epsilon^2_{max} - x^2_i \epsilon^2_{min}}{2} - w_{L_{min}} \right)$$

$$x^{shift}_{max} \geq 0, x^{shift}_{max} \geq x^1_i \epsilon^1_{max} - x^2_i \epsilon^2_{max}, x^{shift}_{max} \geq x^2_i \epsilon^2_{max} - x^1_i \epsilon^1_{max}$$

$$x^{shift}_{min} \geq 0, x^{shift}_{min} \geq x^1_i \epsilon^1_{min} - x^2_i \epsilon^2_{min}, x^{shift}_{min} \geq x^2_i \epsilon^2_{min} - x^1_i \epsilon^1_{min}$$

$$l^i_{min} - (1 - \epsilon^1_1)M \leq C(k)\epsilon^i_1(k) \leq l^i_{max} \forall k \in n_i$$

$$1^T \epsilon^i_1 = 1 + l^i_{max} - l^i_{min}$$

$$l^i_{max} - l^i_{min} \geq 1$$

$$\epsilon^i(k) \geq 0 \forall k \in n_i$$

$$\epsilon^i(k) \geq \epsilon^i_1(k) - (1 - \zeta_i)M \forall k \in n_i$$

$$\epsilon^i(k) \leq \epsilon^i_1(k) + (1 - \zeta_i)M \forall k \in n_i$$

$$\epsilon^i(k) \geq (1 - \epsilon^i_1(k)) - \zeta_i M \forall k \in n_i$$

$$\epsilon^i(k) \leq (1 - \epsilon^i_1(k)) + \zeta_i M \forall k \in n_i$$

$$y_{\beta i-max} \geq y_{\beta i}(k) \forall k \in n_i$$

$$L_{i,max} \geq y^i_k - \beta x^i_k + x_\beta - (1 - \epsilon^i(k))M \forall k \in n_i$$

$$\beta x^i_k - x_\beta \leq y^i_k + (1 - \epsilon^i(k))M \forall k \in n_i$$

$$\beta x^i_k - x_\beta \geq 0 - (1 - \epsilon^i(k))M \forall k \in n_i$$

$$y_{\beta i}(k) \geq 0, y_{\beta i}(k) \geq \beta x^i_k - x_\beta - (1 - \epsilon^i(k))M \forall k \in n_i$$

wherein $x_k^i$=x-coordinate of the $k^{th}$ polygon point on the polygon on side i, $\epsilon^i$=an array or binary variable indicating edges on the polygon on side i, M=a big enough constant value used as an aid tool in linearization, for example 10 billion, $y_k^i$=y-coordinate of the $k^{th}$ polygon point on the polygon on side i, l=running index, β=slope of discontinuity boundary on a plane defined by a polygon, T=transpose of a vector, $\psi_\alpha$=constant that depends on an angle between the planes defined by polygon, and it may be calculated using formula (5), α=angle between the planes defined by polygons, L=distance from polygon corner points to the discontinuity boundary;

$x^{shift}$=value that indicates how far away from each other the selected edges are in x-direction.

$$\Psi_\alpha = \sqrt{\frac{\cos^2\alpha}{\sin^2\alpha + \beta_0^2}} \tan^{-1}\left( \sqrt{\frac{\sin^2\alpha + \beta_0^2}{\cos^2\alpha}} \right) \quad (5)$$

The multi-optimization problem results to provide information needed for creating bend object and both curved section and extension sheet section parameters that can be calculated based on the results of the multi-object optimization. Therefore one can determine a slope of the conical bend by determining two or more radiuses, and then using them to determine the slope, for example. Another way to determine the slope is to use an angle between the planes and an angle between the discontinuity border and the intersection line. A radius may be obtained by determining a distance between discontinuity boundaries, the orientation of the discontinuity boundaries in relation to the intersection line between the planes of the flat sheet objects, and then using the angle between the flat sheet portions. If the slope is below a preset threshold (step 310), the bend shape that is used is changed in step 311 to be a cylindrical shape. The radius for the cylinder may be selected to be the biggest radius fitting inside the discontinuity boundaries. An advantage selecting the biggest radius is that it is easy and quick to calculate. Then, or if the slope is not below a preset threshold (step 310), lateral boundaries are calculated in step 312. More precisely, a shape of a lateral boundary is selected, and then its length is calculated in step 312. As described with FIGS. 1B and 1C, the shape of a lateral boundary may be based on a default shape (like a straight line), or on an automatically selected lateral boundary, or a user may be prompted to add the shape. Then it is checked in step 313, whether or not the resulting object is geometrically unfoldable. The geometric unfoldability may be checked by calculating intersection points of the lateral boundaries and sheet extension sections. If one or more of the intersection points is an inner sheet extension section point after the unfolding, the resulting object is not geometrically unfoldable.

If the object is geometrically unfoldable, the curved section and zero or more sheet extension sections are determined in step 314. The curved section is defined by the lateral boundaries and discontinuity boundaries, and sheet extension sections are placed to areas in which the edge of the flat sheet object does not overlap with the discontinuity boundary. In other words, the sheet extension sections are determined using edges and corresponding discontinuity border. After that the bend object is created in step 315 from the curved section and the extension sheet objects, the bend object is combined in step 316 with the flat sheet objects and the thus created bend sheet object is outputted in step 317 to the user. It should be appreciated that in step 316 the combination includes combining with previously created bend sheet objects (sub-objects) if such objects exist.

If the object is not geometrically unfoldable (step 311), or if there are no paired viable edges (step 306), or the bent sheet object to be created is not topologically unfoldable (step 304), or the flat sheet objects have different thickness (step 303), the process prompts in step 318 the user that creating a bend between the selected flat sheet objects is impossible. The process may be configured to provide also a reason in step 318 so that the user may try to correct the situation. Examples of reasons include "edges of the flat sheet objects that are to be combined by a bend have different thickness" and "the lateral boundary form ends up to a solution that cannot be unfolded".

As can be seen above, the user only needs to select the flat sheet objects and a bend sheet object illustrating the bend sheet structure is created without further user input to its intended location in a folded situation. This facilitates modeling and allows an easier association of the bent sheet object to one or more other objects it is supposed to be attached to in the model.

FIG. 4 illustrates another exemplary functionality of the creation of a bend which differs from the one described with FIG. 3 in that respect that for the creation of a bend more input is requested from the user. More precisely, it illustrates another exemplary functionality of the bent sheet creator unit. In the example it is also assumed, for the sake of clarity, that only one bend is created. Also this process may be repeated for each selected flat sheet object pairs. In the example of FIG. 4 some checking steps, like checking whether the selected edges have the same thickness, are omitted, for the sake of clarity. However, it is obvious to one skilled in the art that they may be performed as well.

Referring to FIG. 4, it is assumed that the user has modeled flat sheet objects, or retrieved a model comprising flat sheet objects, and that the user has selected "create bends", or "connect" functionality, for example. Then a user input selecting two flat sheet objects is detected in step 401. To create the bent sheet object, the process prompts in step 402 the user to provide as input a value for the tradeoff and a shape of the bend, i.e. conical or cylindrical bend, and a shape for the lateral boundary. After that the geometry and location is determined in step 403 and the intersection line in step 404. The steps correspond to above steps 302 and 303, correspondingly and therefore are not repeated in vain herein.

In the example it is assumed that the user may indicate from the selected flat sheet objects edges that are to be combined. Further, in the example it is assumed, for the sake of clarity, that the user indicates all edges to combine or no edges. Therefore, if the user has indicated edges (step 405), the viability of the edges is checked in step 411. If the user has not indicated edges (step 406), viable edges are determined by the process, as described above with step 306. After that, or if the edges indicated by the user are viable (step 411), the edges are paired in step 407, as described above with step 306, and the minimum bend length is calculated in step 407, as described above with step 307.

Then the process continues as described above by calculating the bend parameters in step 408 as is described above with step 309. Then the bent sheet object is created in step 409 and the bent sheet object is outputted in step 410. In other words, the process described above with steps 312 to 316 is summoned herein to step 409, and step 410 corresponds to step 317.

If the edges selected by the user are not viable (step 411), the process proceeds to step 412 in which the user is prompted that it is not possible to create a bend using the edges the user has selected. In another implementation, if the edges selected by the user are not viable, the process ignores them and proceeds to step 406 to determine viable edges.

It should be appreciated that the process may be configured to assume that the user may indicate only some of the edges, in which case the process proceeds from step 411, if the edges selected by the user are viable, to step 406 to determine further viable edges (if any). In the configuration, it depends on the implementation, whether the edges selected by the user are ignored, or the user is prompted that no bend is possible.

FIG. 5 illustrates an exemplary functionality when the user wants to edit a bent sheet object. In the example it is assumed that editing is monitored by the bent sheet creator unit. However, there may be a separate bent sheet editor unit that performs the functionality described below.

In the illustrated example the user is allowed to edit the end point of a lateral boundary (LB) along the discontinuity boundary (DB) and the shape of the lateral boundary.

Referring to FIG. 5, when it is detected in step 501 that a user has selected a bent sheet object and modified it, it is checked in step 502, whether or not the modification was changing the location of the end point of a lateral boundary. If it was, it is checked, whether or not the end point was moved along the discontinuity boundary (step 503) or along an extension of the discontinuity boundary (step 507). If the end point was moved along the discontinuity boundary (step 503) or along the extension of the discontinuity boundary (step 507), it is checked in step 504 whether or not the bent sheet object remained geometrically unfoldable (UF). The checking may be performed as described above with step 312.

If the bent sheet object remains geometrically unfoldable (step 504), the bent sheet object, i.e. its definitions, are updated in step 505 to correspond the new situation.

If the bent sheet object does not remain geometrically unfoldable (step 504), the user is prompted in step 506 that the modification breaks the bent sheet object, and therefore is rejected.

If the end point sheet was not moved along the discontinuity boundary (step 503) and not along its extension (step 507), the process proceeds to step 506 to prompt the user.

If the modification is not changing the end point of a lateral boundary (step 502), it is checked in step 508, whether or not the modification changes the radius of the curved section in a certain point. For example, the user may have changed the bend slope of a conical shape or changed the rounding angle of a cylindrical bend. If the radius of the curved section is changed (step 508), it is checked in step 509 whether or not the curved section still fits between the flat sheet objects. If it fits, the process proceeds to step 504 to check whether or not the bent sheet object remains geometrically unfoldable. If the changed curved section does not fit between the flat sheet objects (step 509), the process proceeds to step 506 to prompt the user.

In the illustrated example, if the modification is not changing the end point (step 502) or the radius of the curved section (step 508), it is assumed that the user has changed the shape of the lateral boundary, and that any shape change does not affect the unfoldability. Therefore the shape of the bent sheet object is updated in step 510 accordingly. However, it should be appreciated that in another implementation before updating the shape, the process may perform the geometrical unfoldability check of step 504, and perform the update only if the bent sheet object remains geometrically unfoldable.

In an implementation in which the user may select whether the curved section has a conical geometry or a cylindrical geometry, the user may modify the bent sheet object by changing the used geometry to another. Such a change may trigger calculation of the bend parameters (described with step 309) and hence re-determination of the bend object, and hence the bent sheet object, as is described with steps 312 to 316, for example.

FIG. 6 illustrates an exemplary functionality when the user modifies the model in such a way that the change will be propagated to a bent sheet object. In the example it is assumed that such propagation is monitored by the bent sheet creator unit. However, there may be a separate bent sheet editor unit that performs the functionality described below. A flat sheet object of a bent sheet object may be associated with a column, and the other one of the flat sheet objects may be associated with a certain point of a beam, and the user moves the column so that the certain point of the beam does not move.

Referring to FIG. 6, when it is detected in step 601 that an associated object of a bent sheet object is moved, the bent sheet object is re-determined in step 602. In other words, the process described above with FIG. 3 or FIG. 4 is performed, except that instead of step 317 or 410, it is indicated that the process succeeded and instead of step 318 or step 412, it is indicated that the process did not succeeded.

If the process succeeds (step 603), i.e. the process resulted to a new bend sheet object, the new bend sheet object is outputted in step 605.

If the process did not succeeded (step 603), the user is prompted in step 605 on an error. The prompt may be "the movement is impossible since the bent sheet structure associated with the moved object will break". Depending on an implementation, the movement may be ignored or the bent sheet structure is deleted, or the user is provided to perform a choice between the two alternatives.

The steps shown in FIGS. 3 to 6 are not in an absolutely chronological order, and they may be executed in a different order than given here, or simultaneously. For example, step 303 in which the thickness is checked, may be performed after the edges are determined and instead of checking the thickness of the flat sheet object, the thickness on the edge (or thickness of the edge), may be checked. Other functions may be carried out between or after the described steps or simultaneously with them. For example, the parameters defining the bent sheet object are stored to be part of the model when the model is stored. It is also possible to leave out some of the steps shown in the Figures. It is also possible to replace some of the described steps by a step that produces a corresponding end result.

The techniques described herein may be implemented by various means so that an apparatus implementing one or more functions described with an example/implementation comprises not only prior art means, but also means for implementing the one or more functions and it may comprise separate means for each separate function, or means may be configured to perform two or more functions. For example, the bent sheet creator unit and/or corresponding algorithms may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein.

Figure 7:
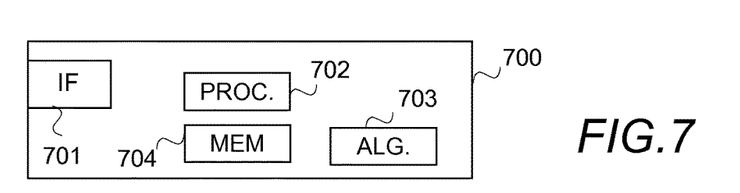
FIG. 7 is a schematic block diagram of an exemplary apparatus.

FIG. 7 is a simplified block diagram illustrating some units for an apparatus 700 configured to be an apparatus comprising at least the bent sheet creator unit. In the illustrated example the apparatus comprises one or more interfaces (IF) 701 for interaction with a user, and possibly for receiving and transmitting information, a processor 702 configured to implement at least the bent sheet creator unit, or at least one of its sub-units, functionality described herein with corresponding algorithm/algorithms 703 and a memory 704 usable for storing a program code required at least for the bent sheet creator unit or at least one of its sub-units, i.e. the algorithms for implementing corresponding functionality. The memory 704 is also usable for storing other possible information, like the model or the working copy of the model. An embodiment provides a computer program embodied on any client-readable distribution/data storage medium or memory unit(s) or article(s) of manufacture, comprising program instructions executable by one or more processors/computers, which instructions, when loaded (downloaded) into an apparatus, constitute the bent sheet creator unit or at least one of its sub-units. Programs, also called program products, including software routines, program snippets constituting "program libraries", applets and macros, can be stored in any medium and may be downloaded into an apparatus. In other words, each or some or one of the units/sub-units and/or the algorithms described above may be an element that comprises one or more arithmetic logic units, a number of special registers and control circuits.

Generally the processor 702 is a central processing unit, but the processor 702 may be an additional operation processor, controller, control unit, micro-controller, a single-chip computer element, a chipset, or the like connected to a memory and to various interfaces of the apparatus.

More precisely, each or some or one of the units and/or algorithms described herein may be configured as a computing device including at least a memory for providing storage area used for arithmetic operation and an operation processor for executing the arithmetic operation. Each or some or one of the units and/or algorithms described above may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments/implementations/examples or to perform functionalities from different embodiments/examples/implementations. In other words, each or some or one of the units and/or the algorithms described above may be an element that comprises one or more arithmetic logic units, a number of special registers and control circuits.

Further, the memory 704 may include volatile and/or non-volatile memory, for example EEPROM, ROM, PROM, RAM, DRAM, SRAM, double floating-gate field effect transistor, firmware, programmable logic, etc. and typically store content, data, or the like. The memory 704 or memories may be of any type (different from each other), have any possible storage structure and, if required, being managed by any database management system. The memory may also store computer program code such as software applications (for example, for one or more of the units/algorithms) or operating systems, information, data, content, or the like for the processor to perform steps associated with operation of the apparatus in accordance with examples/implementations. The memory, or part of it, may be, for example, random access memory, a hard drive, or other fixed data memory or storage device implemented within the processor/apparatus or external to the processor/apparatus in which case it can be communicatively coupled to the processor/network node via various means as is known in the art. Examples of an external memory include a removable memory detachably connected to the apparatus, a distributed database, and a cloud server.

Further, the apparatus may comprise other units not described herein.

It will be obvious to a person skilled in the art that, as the technology advances, the inventive concept can be implemented in various ways. The invention and its embodiments are not limited to the examples described above but may vary within the scope of the claims.

What is claimed is:

1. A computer implemented method comprising:
running in a computer a modeling application that uses three-dimensional folded bent sheet objects to model bent sheet structures, a single bent sheet object modeling a single sheet structure in a folded state in which a single flat sheet structure has been bended one or more times;

detecting a user input triggering a bend creation;

detecting a user input selecting two flat sheet objects modeled into their intended location and position in a three-dimensional model;

determining, by the modeling application, from the two flat sheet object edges between which a bend will be created;

checking, by the modeling application, whether the bent sheet object is topologically unfoldable and whether the two flat sheet objects have the same thickness, wherein the running of the modeling application is stopped upon a determination that the bent sheet object is topologically unfoldable or that the two flat sheet objects have different thicknesses;

calculating, by the modeling application, a minimum bend length between the edges;

calculating, by the modeling application, parameters for a bend by optimizing a maximum bend width using a multi-objective optimization with a tradeoff between a length and a width of the bend;

using, by the modeling application, the parameters to define a curved section and zero or more sheet extension sections between edges and the curved section;

creating, by the modeling application, to the model a folded bent sheet object by combining the two flat sheet objects, the curved section and the zero or more sheet extensions, the folded bent sheet object modeling a real-world sheet structure in the folded state; and displaying the model including the folded bent sheet object on one or more interfaces.

2. The computer implemented method of claim 1, further comprising performing, by the modeling application, the calculations and creation only if the edges have the same thickness.

3. The computer implemented method of claim 1, further comprising determining, by the modeling application, the edges by determining an intersection line between planes on which the flat sheet objects locate, and selecting an edge if on both sides of the edge the normal points either towards or away from the intersection line.

4. The computer implemented method of claim 1, further comprising calculating, by the modeling application, the minimum bend length using linear optimization.

5. The computer implemented method of claim 1, wherein the value for the tradeoff is a constant value obtained as a user input.

6. The computer implemented method of claim 1, wherein the value for the tradeoff is a preset constant value.

7. The computer implemented method of claim 1, further comprising formulating the multi-objective optimization to a mixed integer linear programming problem.

8. The computer implemented method of claim 7, wherein the mixed integer linear programming problem is as follows:

$$\min -w(\epsilon_1,\epsilon_2,p)$$

$$\text{s.t.} \Delta L(\epsilon_1,\epsilon_2,p) \leq \xi \Delta w(\epsilon_1,\epsilon_2,p)$$

wherein $\Delta L$ is the net average length,
$\xi$ is the value for the tradeoff,
$\Delta w$ is the net width,
$w$ is the width,
$\epsilon_1$ is a binary vector determining the selected edges on the side of the flat sheet object 1,
$\epsilon_2$ is a binary vector determining the selected edges on the side of the flat sheet object 2,
p is a vector of the bend parameters.

9. The computer implemented method of claim 1, wherein the minimum bend length is calculated using the following mixed integer linear programming problem:

$$\min_{\epsilon_1,\epsilon_2} \bar{L}_{curve}(\epsilon_1, \epsilon_2, p) + \bar{L}_1(\epsilon_1, \epsilon_2, p) + \bar{L}_2(\epsilon_1, \epsilon_2, p) + \bar{L}_{shift}(\epsilon_1, \epsilon_2, p)$$

$$\text{s.t.}$$

$$E_1 \epsilon_1 = 1$$

$$E_2 \epsilon_2 = 1$$

$$\sum \epsilon_1 = 1$$

$$\sum \epsilon_2 = 1,$$

wherein
$\bar{L}_{curve}$ is the average length of the curved section,
$\bar{L}_1$ is the average length of the sheet extension section on the side of the polygon 1,
$\bar{L}_2$ is the average length of the sheet extension section on the side of the polygon 2,
$\bar{L}_{shift}$ is a measurement of distance between the lateral edge of the curved section and the lateral edge of the sheet extension section on the discontinuity boundary,
$\epsilon_1$ is a binary vector determining the selected edge on the side of the flat sheet object 1,
$\epsilon_2$ is a binary vector determining the selected edge on the side of the flat sheet object 2,
p is a vector of the bend parameters
$E_1$ is a binary vector determining the possible edge on the side of the flat sheet object 1,
$E_2$ is a binary vector determining the possible edge on the side of the flat sheet object 2.

10. The computer implemented method of claim 1, wherein the minimum bend length is calculated using the following mixed integer linear programming problem:

$$\min_{\epsilon_1,\epsilon_2} \frac{A(\epsilon_1, \epsilon_2)}{w(\epsilon_1, \epsilon_2)}$$

$$\text{s.t.}$$

$$E_1 E_1 \epsilon_1 = 1$$

$$E_2 \epsilon_2 = 1$$

$$\sum \epsilon_1 = 1$$

$$\sum \epsilon_2 = 1,$$

wherein
A is a function of decision variables determining the area of the bend object
w is a function of the decision variables determining the width of the bend object
$\epsilon_1$ is a binary vector determining the selected edges on the side of the flat sheet object 1
$\epsilon_2$ is a binary vector determining the selected edges on the side of the flat sheet object 2
$E_1$ is a binary vector determining the possible edges on the side of the flat sheet object 1
$\epsilon_2$ is a binary vector determining the possible edges on the side of the flat sheet object 2.

11. The computer implemented method of claim 1, wherein the bent sheet object represents sheet metal.

12. A computer implemented method comprising:
running in a computer a modeling application that uses three-dimensional folded bent sheet objects to model bent sheet structures, a single bent sheet object modeling a single sheet structure in a folded state in which a single flat sheet structure has been bended one or more times;
detecting, by the modeling application, a user input modifying a bent sheet object comprising at least a curved section having two discontinuity boundaries and two lateral boundaries, a discontinuity boundary being a straight line between a sheet extension or a flat sheet object and the curved section;
checking, by the modeling application, whether the modification is one of the following modifications comprising moving an end point of a lateral boundary along a discontinuity boundary or its extension, and a change of radius;
checking, by the modeling application, whether the two discontinuity boundaries have the same thickness;
verifying, by the modeling application, in response to the modification being one of the moving an end point of a lateral boundary along a discontinuity boundary or its extension and a change of radius, the topological unfoldability of the bent sheet object after the modification, wherein the running of the modeling application is stopped upon a determination that the bent sheet object is topologically unfoldable or that the two flat sheet objects have different thicknesses;
accepting, by the modeling application, the modification if the bent sheet object remains unfoldable; and
displaying the model including the folded bent sheet object on one or more interfaces.

13. A computer implemented method comprising:
running in a computer a modeling application that uses three-dimensional folded bent sheet objects to model bent sheet structures, a single bent sheet object modeling a single sheet structure in a folded state in which a single flat sheet structure has been bended one or more times;
detecting, by the modeling application, a modification of an associated object causing at least a modification of a bent sheet object;
determining, by the modeling application, from the bent sheet object at least two flat sheet objects combined by a curved section before the modification;
determining, by the modeling application, from the two flat sheet object edges between which an updated bend will be created;
checking, by the modeling application, whether the bent sheet object is topologically unfoldable and whether the two flat sheet objects have the same thickness, wherein the running of the modeling application is stopped upon a determination that the bent sheet object is topologically unfoldable or that the two flat sheet objects have different thicknesses;
calculating, by the modeling application, a minimum bend length between the edges;
calculating, by the modeling application, parameters for an updated bend by optimizing a maximum bend width using a multi-objective optimization with a tradeoff between a length and a width of the updated bend;
using, by the modeling application, the parameters to define an updated curved section and zero or more updated sheet extension sections between edges and the curved section;
updating, by the modeling application, the folded bent sheet object by combining the two flat sheet objects, the updated curved section and the zero or more updated sheet extensions; and
displaying the folded bent sheet object on one or more interfaces.

14. The computerized method of claim 13, further comprising:
accepting, by the modeling application, the modification if the bent sheet object remains unfoldable after its updating.

15. The computerized method of claim 13, further comprising:
formulating the multi-objective optimization to a mixed integer linear programming problem; and
using a constant value for the tradeoff.

16. An apparatus comprising at least one processor and at least one memory including a computer program code, the at least one memory and the computer program code being configured to, with the at least one processor, cause, in response to receiving, while running a modeling application, which uses three-dimensional folded bent sheet objects to model bent sheet structures, a single bent sheet object modeling a single sheet structure in a folded state in which a single flat sheet structure has been bended one or more times, a bend creation triggering user input, the apparatus at least to:
determine, in response to a user input indicating at least two flat sheet objects modeled into their intended location and position in a three-dimensional model, from the two flat sheet object edges between which a bend will be created;
checking, by the modeling application, whether the bent sheet object is topologically unfoldable and whether the two flat sheet objects have the same thickness, wherein the running of the modeling application is stopped upon a determination that the bent sheet object is topologically unfoldable or that the two flat sheet objects have different thicknesses;
calculate a minimum bend length between the edges;
calculate parameters for a bend by optimizing a maximum bend width using a multi-objective optimization with a tradeoff between a length and a width of the bend;
use the parameters to define a curved section and zero or more sheet extension sections between edges and the curved section;
create to the model a folded bent sheet object by combining the two flat sheet objects, the curved section and the zero or more sheet extensions, the folded bent sheet object modeling a real-world sheet structure in the folded state; and
display the model including the folded bent sheet object on one or more interfaces.

17. The apparatus of claim 16, wherein the at least one memory and the computer program code configured to, with the at least one processor, further cause the apparatus to use a mixed integer linear programming problem with a constant tradeoff as the multi-objective optimization.

18. A non-transitory computer readable media having stored thereon instructions that, when executed by an apparatus, cause the apparatus to:
run a modeling application that uses three-dimensional folded bent sheet objects to model bent sheet structures, a single bent sheet object modeling a single sheet structure in a folded state in which a single flat sheet structure has been bended one or more times;

trigger a bend creation procedure in response to a corresponding user input, the bend creation procedure including:

determining, in response to a user input selecting two flat sheet objects modeled into their intended location and position in a three-dimensional model, from the two flat sheet object edges between which a bend will be created;

checking, by the modeling application, whether the bent sheet object is topologically unfoldable and whether the two flat sheet objects have the same thickness, wherein the running of the modeling application is stopped upon a determination that the bent sheet object is topologically unfoldable or that the two flat sheet objects have different thicknesses;

calculating a minimum bend length between the edges;

calculating parameters for a bend by optimizing a maximum bend width using a multi-objective optimization with a tradeoff between a length and a width of the bend;

defining, by using the parameters, a curved section and zero or more sheet extension sections between edges and the curved section;

creating to the model a folded bent sheet object by combining the two flat sheet objects, the curved section and the zero or more sheet extensions, the folded bent sheet object modeling a real-world sheet structure in the folded state; and displaying the model including the folded bent sheet object on one or more interfaces.

19. The non-transitory computer readable media of claim 18, having stored thereon further instructions, which when executed by the apparatus, further cause, in response to detecting a modification of an associated object causing a modification of the folded bent sheet object, the apparatus to:

determine from the folded bent sheet object at least two flat sheet objects combined by the bend before the modification;

determine from the two flat sheet object edges between which an updated bend will be created;

calculate a new minimum bend length between the edges;

calculate parameters for an updated bend;

define, by using the parameters, an updated curved section and zero or more updated sheet extension sections between edges and the curved section; and update the folded bent sheet object by combining the two flat sheet objects, the updated curved section and the zero or more updated sheet extensions.

* * * * *